United States Patent
Raif et al.

(10) Patent No.: US 9,430,872 B2
(45) Date of Patent: Aug. 30, 2016

(54) PERFORMANCE PREDICTION FOR GENERATION OF POINT CLOUDS FROM PASSIVE IMAGERY

(71) Applicant: Raytheon Company, Waltham, MA (US)

(72) Inventors: Stephen J. Raif, Richardson, TX (US); John J. Coogan, Bedford, TX (US); Steven B. Seida, Wylie, TX (US); Paul L. Pryor, Garland, TX (US); Carlton E. Nance, Rockwall, TX (US); Wyatt D. Sharp, III, Murphy, TX (US); Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 168 days.

(21) Appl. No.: 14/201,008

(22) Filed: Mar. 7, 2014

(65) Prior Publication Data

US 2014/0253543 A1    Sep. 11, 2014

Related U.S. Application Data

(60) Provisional application No. 61/774,940, filed on Mar. 8, 2013.

(51) Int. Cl.
  *G06F 17/30* (2006.01)
  *G06T 17/00* (2006.01)
  *G06T 7/00* (2006.01)
  *G06T 17/05* (2011.01)

(52) U.S. Cl.
  CPC ......... *G06T 17/00* (2013.01); *G06F 17/30241* (2013.01); *G06T 7/0002* (2013.01); *G06T 17/05* (2013.01); *G06F 17/30256* (2013.01); *G06T 2200/04* (2013.01); *G06T 2207/10028* (2013.01); *G06T 2207/30168* (2013.01); *G06T 2210/56* (2013.01)

(58) Field of Classification Search
  None
  See application file for complete search history.

(56) References Cited

U.S. PATENT DOCUMENTS

| | | | |
|---|---|---|---|
| 2005/0027475 A1* | 2/2005 | Desa | G01N 21/55 702/156 |
| 2011/0080475 A1* | 4/2011 | Lee | G06F 3/017 348/77 |

FOREIGN PATENT DOCUMENTS

WO    WO-2014/138622 A1    9/2014

OTHER PUBLICATIONS

Fukugawa, Yasutaka, et al. "Towards internet-scale multi-view stereo" Computer Vision and Pattern Recognition (CVPR), 2010 IEEE Conference on. IEEE, 2010.*

(Continued)

*Primary Examiner* — Phi Hoang
*Assistant Examiner* — Diane Wills
(74) *Attorney, Agent, or Firm* — Schwegman Lundberg & Woessner, P.A.

(57) ABSTRACT

A system and method of generating point clouds from passive images. Image clusters are formed, wherein each image cluster includes two or more passive images selected from a set of passive images. Quality of the point cloud that could be generated from each image cluster is predicted for each image cluster based on a performance prediction score for each image cluster. A subset of image clusters is selected for further processing based on their performance prediction scores. A mission-specific quality score is determined for each point cloud generated and the point cloud with the highest quality score is selected for storage.

21 Claims, 9 Drawing Sheets

(56) References Cited

OTHER PUBLICATIONS

Kalogerakis, Evangelos, et al. "Image sequence geolocation with human travel priors." Computer Vision, 2009 IEEE 12th International Conference on. IEEE, 2009.—Geolocation accuracy.*

Khan, Nabeel, McCane, Brendan, and Steven Mills. "Feature set reduction for image matching in large scale environments." Proceedings of the 27th Conference on Image and Vision Computing New Zealand. ACM, 2012.*

Zhu, Shengqi, Li Zhang, and Brandon M. Smith. "Model evolution: An incremental approach to non-rigid structure from motion." Computer Vision and Pattern Recognition (CVPR), 2010 IEEE Conference on. IEEE, 2010.*

"International Application Serial No. PCT/US2014/021896, International Search Report mailed Jul. 21, 2014", 6 pgs.

"International Application Serial No. PCT/US2014/021896, Written Opinion mailed Jul. 21, 2014", 6 pgs.

Gruen, A., et al., "Sensor Modeling for Aerial Mobile Mapping with Three-Line-Scanner (TLS) Imagery", *ISPRS Commission II Symposium, Integrated System for Spatial Data Production, Custodian and Decision Support*, Aug. 20-23, 2002, Xian, China, [online]. [retrieved on Jul. 14, 2014]. Retrieved from the Internet: <URL:http://www.idb.arch.ethz.ch/files/grue>, (2002), 7 pgs.

Gruen, Armin, et al., "3D Precision Processing of High-Resolution Satellite Imagery", *ASPRS 2005 Annual Conference—"Geospatial Goes Global: From Your Neighborhood to the Whole Planet"*, Mar. 7-11, 2005, Baltimore, Maryland, [online]. [retrieved on Jul. 10, 2014]. Retrieved from the Internet: <URL:http://www.researchgate.net/profile/Arm>, (2005), 14 pgs.

* cited by examiner

| IMAGE CLUSTERS | METADATA-BASED PERFORMANCE SCORE | CORRELATOR-BASED PERFORMANCE SCORE | QUANTITATIVE METRICS | QUALITATIVE METRICS |
|---|---|---|---|---|
| CLUSTER 1 | 6 | 7 | -- | -- |
| CLUSTER 2 | 3 | -- | -- | -- |
| CLUSTER 3 | 5 | 4 | -- | -- |
| CLUSTER 4 | 9 | 9 | 8 | 7 |
| CLUSTER 5 | 1 | -- | -- | -- |
| CLUSTER 6 | 9 | 8 | 7 | 8 |
| CLUSTER 7 | 4 | -- | -- | -- |
| -- | -- | -- | -- | -- |
| CLUSTER N | 1 | -- | -- | -- |

PERFORMANCE PREDICTION FOR GENERATION OF POINT CLOUDS FROM PASSIVE IMAGERY

CROSS-REFERENCE TO RELATED APPLICATIONS

This application claims the benefit of U.S. Provisional Application No. 61/774,940, filed Mar. 8, 2013, titled "PERFORMANCE PREDICTION FOR GENERATION OF POINT CLOUDS FROM PASSIVE IMAGERY".

BACKGROUND

A point cloud is a set of points in a three-dimensional coordinate system. In general, a point cloud is a three-dimensional model of a location. In geographic information systems, for example, point clouds are used to make digital elevation models of the terrain, or to generate three-dimensional models of, for instance, an urban environment.

Point clouds can be formed by combining two-dimensional images captured from two or more perspectives. Point cloud generation from passive imagery can, however, be a computationally expensive and time consuming process.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As noted above, point clouds can be formed by combining two-dimensional images captured from two or more perspectives. The quality of the point cloud depends on both the quality of the underlying two-dimensional images as well as the quality of the correlation between scene features in the different images. In addition, although the point cloud can be generated from passive imagery from many different perspectives, to do so can a computationally expensive and time consuming process. One must take care to choose a set of images of sufficient quantity and sufficient quality to generate the point cloud.

Figure 1:
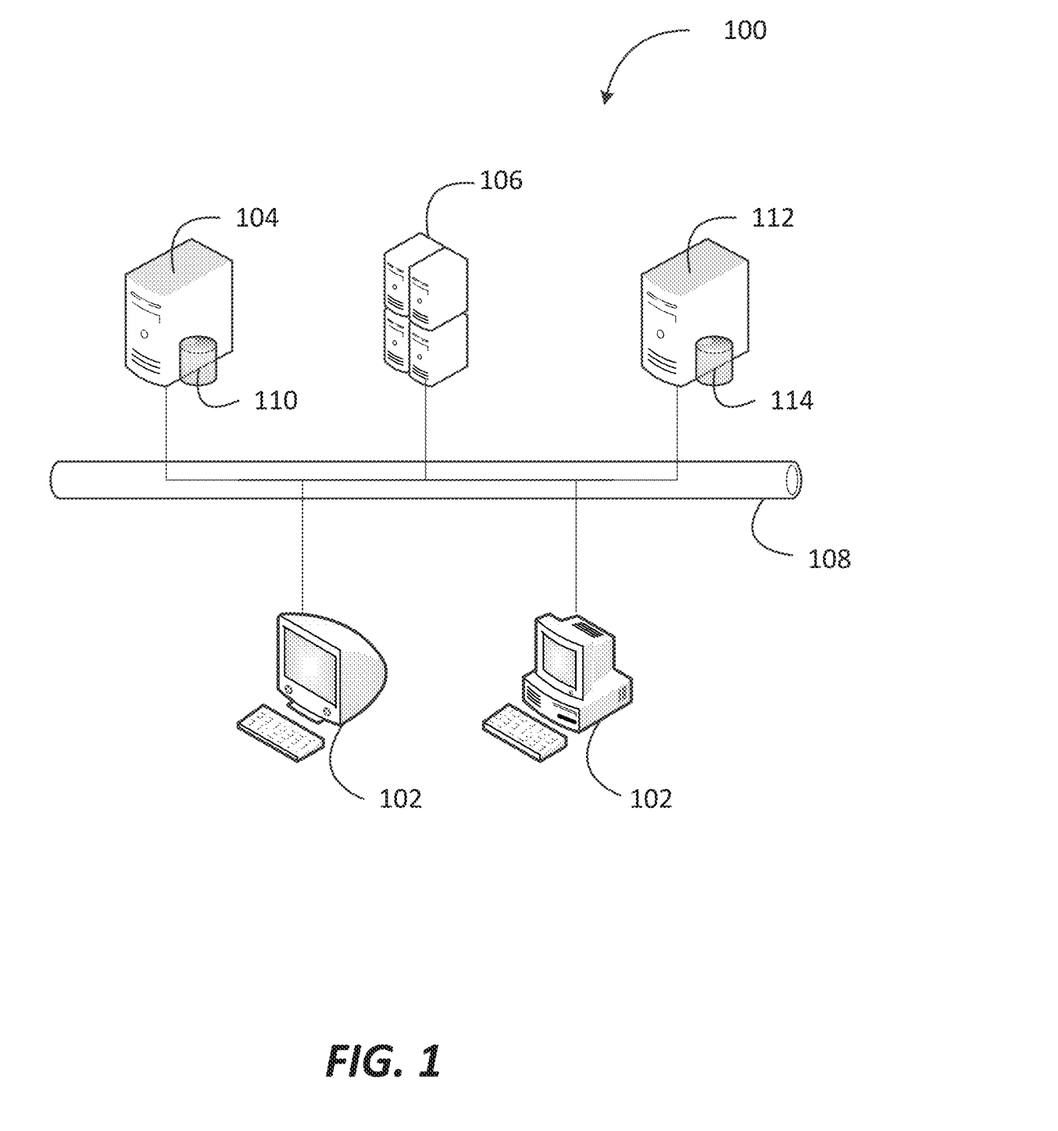
FIG. 1 illustrates a point cloud generating system.

A point cloud generating system 100 is shown in FIG. 1. In the point cloud generating system of FIG. 1, one or more computers 102 are connected across a network 108 to one or more of a database server 106 and a file management server 104. In one embodiment, two-dimensional images and photographs are stored in database server 106 and are reviewed as will be detailed below to determine which, if any, of the images and photographs should be used to generate a point cloud. In other embodiments, two-dimensional images and photographs are stored in storage 110 attached to file management server 104.

In some embodiments, an image processing server 112 is added to system 100 in order to provide a central location for processing the two-dimensional images into a point cloud before storing the point cloud into storage 114.

In one embodiment, system 100 includes a method of predicting the quality of a passive imagery derived point cloud before it is generated. Point cloud generation can be a computationally expensive and time consuming process. This method enables operators and automated systems to intelligently decide whether or not to invest the resources to build a given point cloud based on the available imagery. In addition, this method can assist an operator or automatic tasking system how to collect new, additional images with the purpose of improving point cloud quality. Therefore, performance prediction is an enabler both for automation and for improved data quality.

To date, automated point cloud generation systems such as system 100 have applied a brute force "try it and see" approach to processing. Time and resources are wasted building point clouds out of imagery that is not sufficient to the task. In some embodiments, system 100 provides an objective way to decide if and how to kick off point cloud generation based on a pool of available imagery, and to predict how proposed tasking will improve current point clouds.

In some embodiments, system 100 includes a point cloud quality scoring system tuned for a given analyst application or need. In the same way that the National Image Interpretability Rating Scales (NIIRS) calculation is used to predict the usefulness of a 2-dimensional image to an analyst, a calculation is used to predict the usefulness of a 3-dimensional point cloud. Both the NIIRS and the point cloud quality scoring system make this prediction without actually viewing the data set being scored. That is, the point cloud quality scoring system estimates point cloud quality prior to the generation of the point cloud. The types of applications for point clouds are often non-complementary; thus, in some embodiments, a different scoring system is used for each application. Examples of point cloud applications include: building/vehicle identification and extraction, volumetric change detection, vertical obstruction detection, three-dimensional coordinate extraction for targeting, elevation map generation, line-of-sight generation, flood-model generation, and immersive environment generation. Specialized point cloud quality scoring systems can be created for each application.

In one embodiment, the point cloud quality scoring system includes quality scoring of point cloud metrics. In one such embodiment, system 100 maps one or more objective point cloud metrics to a more subjective task capability measurement.

In some embodiments, system 100 includes methods for predicting the point cloud quality score based on a set of input imagery. In one embodiment, there are two prediction options: 1) Narrowband only prediction and 2) Wideband prediction.

Figure 2A:
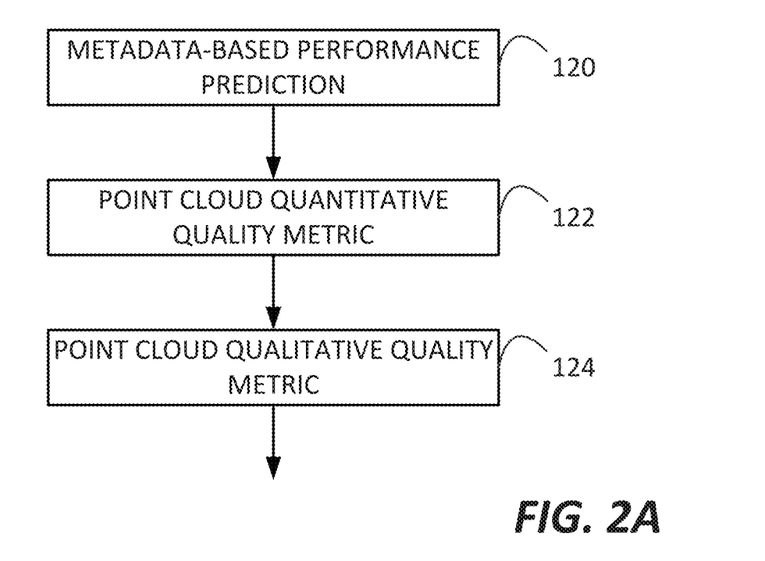
FIGS. 2A and 2B illustrate methods of predicting performance of a point cloud build.

Narrowband prediction predicts the point cloud quality scores using only metadata associated with the imagery. A method of generating narrowband point cloud quality scores using metadata is shown in FIG. 2A. Metadata for this prediction is selected from data such as sensor collection angle, solar angle, image resolution, time-of-day, time-of-year, ground sample distances, and geometric error values. This prediction option has the advantage that the input metadata is lightweight and is optimal for transferring across a bandwidth-constrained network. The disadvantage is that the metadata does not provide a complete descriptive model for the imagery, and thus has a lower confidence level. In some embodiments, narrowband-only prediction is used as a pruning process to decide whether to perform wideband prediction.

In the example shown in FIG. 2A, a metadata-based performance prediction is performed at 120. At 122, point cloud quantitative metrics are derived from a generated point cloud using computational methods or data sets. Since the metrics are calculated on the final product, the quality metrics are extremely accurate. Some quality metrics include point cloud density, point cloud predicted noise level and periodic checks of predicted geolocation accuracy using ground truth sites.

In some embodiments, control then moves to 124, where human operators use metrics such as perceived density/completeness and perceived noise are metrics to determine point cloud quality.

Figure 2B:
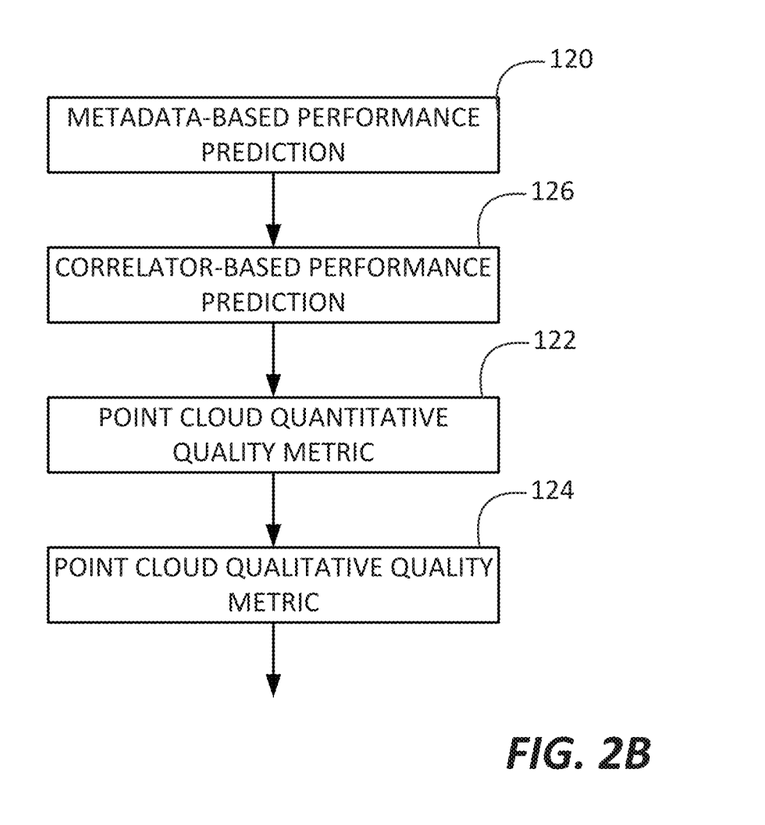

Wideband prediction uses both the metadata and the imagery itself for predicting point cloud quality. A method of generating wideband point cloud quality scores using metadata is shown in FIG. 2B. Metrics can be derived from the imagery such as cloud cover percentages, intensity variance, image-to-image correlation and covariance. In some embodiments, this is done by applying image correlation algorithms to the imagery. Some representative algorithms include correlation score histograms, correlation success rates, and correlation ray intersection statistics. In some embodiments, correlation covariance contributes to rigorous prediction of geolocation accuracy (absolute and relative) via photogrammetric error propagation for every cloud point.

Wideband prediction has the disadvantage that wideband data is necessary for the prediction (and thus cannot be calculated until transferred across a potentially bandwidth constrained network), but it has the advantage that the confidence level of the prediction is much higher. Intermediate values in the prediction process include objective predictive values such as bundle adjustment a posteriori horizontal and vertical error covariance, point cloud density (as a function of surface orientation), point cloud void metric, point cloud blunder metric, point cloud range-error metric, and a point cloud height discontinuity metric.

In the example shown in FIG. 2B, a metadata-based performance prediction is performed at 120 and a correlator-based performance prediction is determined at 126. At 122, point cloud quantitative metrics are derived from a generated point cloud using computational methods or data sets. Since the metrics are calculated on the final product, the quality metrics are extremely accurate. Some quality metrics include point cloud density, point cloud predicted noise level and periodic checks of predicted geolocation accuracy using ground truth sites.

In some embodiments, control then moves to 124, where human operators use metrics such as perceived density/completeness and perceived noise are metrics to determine point cloud quality.

It should be noted that performance improvement, for both point cloud quality and absolute and relative geolocation accuracy, does not simply track with number of collections. More doesn't mean better. Geolocation accuracy and point cloud quality result from complex interactions of collection geometry, sensor metadata, and scene content.

An example metadata-based performance score is shown below:

Metadata-Based Performance Score=$A$*BestConvergenceScore^2+ $B$*WorstConvergenceScore^2+$C$*GSD^2+ $D$*ReferenceOffNadirAngle^2+ $E$*PredictedShadowLevel^2 where the Convergence Score is a function of the convergence angle, the angle between line-of-sight vectors from pairs of images:

ConvergenceScore=$F$*AngleDeltaFromIdealConvergence^2+$G$*DeltaSolarAngle

An example correlator-based performance score is shown below:

Correlator-Based Performance Score=$c1$*(average GSD of the image list)^(−1)+$c2$*(max average correlation score of the image list)+$c3$*(min average correlation score of the image list)+$c4$*(collection elevation score)+$c5$*(solar elevation score)+$c6$*(average relative convergence angle)+$c7$*(average relative solar angle)+$C8$*(tiepoint score)

where, in one embodiment, $c1=1$, $c2=30$, $c3=15$, $c4=40$, $c5=35$, $c6=-0.1$, $c7=-0.9$, and $c8=5$;

where the collection elevation score=1−(abs(90−average elev)/90);

where the solar elevation score=1−(abs(90−average elev)/90); and where the tiepoint score=(sum of image list tiepoints)/max (tiepoints for a single image-to-reference pair within image list.

In some embodiments, the results of the metadata-based performance score and the correlator-based performance score are normalized to a 1-10 scale.

In one embodiment, a metadata-based performance score is used to score all combinations, with correlator-based performance scoring confined to a subset of image clusters having the highest metadata-based performance scores.

Example metrics that can be used as part of a correlator-based performance score will be discussed next.

When calculating a tiepoint via cross correlation, a candidate pixel location from a reference image is chosen, and a small region around that candidate pixel location is chipped from the "reference" image (called a template window). Then, the template window "slides" over a search region in the "reference complement" image, generating a correlation score at each candidate location. The correlation scores comprise a 2D correlation surface, where the highest score can be found at the location where the reference candidate pixel location best matches a location in the reference complement image. This pairing of a pixel location in the reference image and a pixel location in the reference complement image is a tiepoint.

One can capture multiple metrics from a single tiepoint calculation. For instance, a tiepoint correlation score can be calculated as the peak score on the correlation surface for the tiepoint. A high score indicates a higher likelihood of a match than a low score. However, a high correlation score alone is not sufficient and can be further weighted by other values, such as the Template/Search Edge Magnitude, the Template/Search Edge Phase Variance, the Tiepoint Figure of merit, and Quadratic fit results.

The Template/Search Edge Magnitude is the "strength" of edge features in the template window and/or search window.

The Template/Search Edge Phase Variance is the variance of the edge phase values in the template window and/or search window. Lower values indicate an inability to identify a strong 2D feature. Strong 2D features include point-spreads and corners.

The Tiepoint Figure of merit is the ratio of the peak correlation score to the second highest peak correlation score.

The Quadratic fit results are the correlation peak can sometimes be modeled as a 2D quadratic. Quadratic regression can capture additional metrics, such as the "sharpness" of the peak or the correlation coefficient.

Another metric that can be captured from a single tiepoint calculation is the Tiepoint Success/Fail Flag. The Tiepoint Success/Fail Flag recognizes failed tiepoints. Tiepoints can often be considered "failed" for various reasons, such as the correlation peak value being on the edge of the correlation surface (indicating that the true correlation peak may be outside the area searched), the correlation peak value being outside of some acceptable range, where an acceptable range might be (0, 1), or the reference complement image not completely covering the proposed search window.

Other metrics that can be captured from a single tiepoint calculation include tiepoint ray intersection statistics. The rays from the tiepoint origins can be projected through the image geometries to identify an intersection location from which additional metrics can be derived. In some embodiments, the most useful ray intersection metric is the magnitude of the vector of minimum distance, i.e. the distance between the two rays at their nearest point of intersection.

When a single reference image is compared to a reference complement image via calculating a fixed grid of tiepoints, the resulting tiepoints and associated metrics provide useful performance prediction metrics such as the tiepoint success rate or success percentage, the number of successful tiepoints within a given geographic region, the average (mean) correlation score, and the Correlation score histogram.

The tiepoint success rate or success percentage is the percentage of gridded tiepoint calculations that resulted in a "successful" tiepoint.

The number of successful tiepoints within a given geographic region is the product of the tiepoint success percentage and the reference image resolution. It provides an estimate of "density" of points that would result if these images were to be used to build a point cloud. This metric is the foundation of the "Tiepoint Score" metric used in the correlator-based performance score calculation discussed above.

The average (mean) correlation score is the average correlation score for all successful tiepoints. It provides a rough estimate of similarity between 2 images.

The correlation score histogram: A histogram may provide information that a single mean value cannot. For example, an image pair may have a high percentage of correlation scores that are in the bottom bins (where one of the images had haze or clouds) and a high percentage of correlation scores that are in the top bins (where the images were clear), when averaged to a single value results in a less than exceptional mean correlation score. The single mean score indicates an "average" pair of images, but the histogram indicates that there are some regions in the image pair that are exceptionally useful for point cloud generation.

Other image-to-image metrics can be collected and considered during performance prediction, such as the mean figure-of-merit or the mean template edge magnitude.

In one embodiment, predicted geolocation accuracy is based on metadata. Input data is selected from geometry angles and sensor error models for multiple subsets of images and a "best-choice" image selection is made to insure sufficient "geometric diversity". Such an approach does not require image correlation; correlation performance is estimated instead. This approach trades off accuracy for fast assessment.

In another embodiment, predicted geolocation accuracy is based on the metadata discussed above and on image correlation error covariance. Such an approach results in full photogrammetric bundle adjustment error propagation and provides absolute geolocation accuracy and relative (point-to-point) geolocation accuracy at the cost of significantly heavier processing time. Point-to-point accuracies are crucial for mensuaration (e.g., measuring lengths of buildings).

In one embodiment, geolocation accuracy estimates are available for every point in the cloud (absolute) and for every pair of points in the cloud (relative).

In one embodiment, accuracy information conforms to NGA-standard Universal Lidar Error Model (ULEM).

In one embodiment, a metadata-based performance score is used to score all combinations, with geolocation accuracy estimates confined to a subset of image clusters having the highest metadata-based performance scores.

Figure 3:
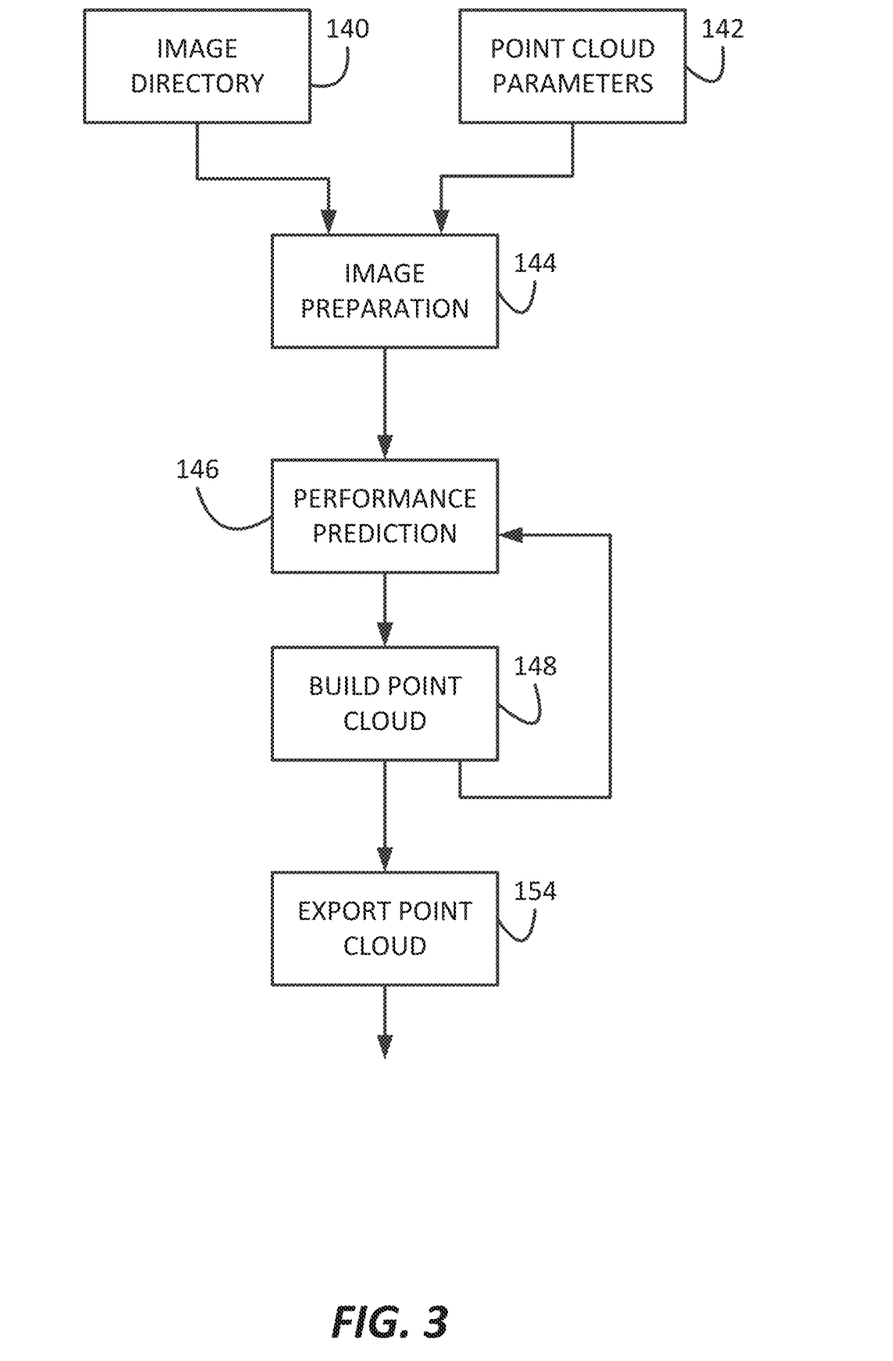
FIGS. 3-4 illustrate methods of selecting images and of building a point cloud from the images.

A method of building a point cloud in system 100 is shown in FIG. 3. In the example shown in FIG. 3, images stored in an image directory are downloaded into a computer 102 or into an image processing server 112 at 140. In one such embodiment, to build a point cloud, all available imagery for a given geolocation is downloaded into a processor within system 100. In addition, at 142, point cloud parameters are loaded into system 100. In one such embodiment, point cloud parameters include the latitude, the longitude, and the radius of the desired point cloud.

At 144, images downloaded at 140 are chipped and only those images that fully cover the view under review are kept. The images that fully cover the view under review then become the set of imagery for performance prediction processing. In addition, at 144, metadata is extracted from each image.

At 146, the images are clustered and a performance prediction is made for each cluster. In some embodiments, a first pass is made based on a metadata-based performance prediction and a subset of image clusters is identified. That subset of image clusters then receives the more computationally intensive correlator-based performance evaluation. One or more image clusters is identified and passed to 148 to be used to build a point cloud.

At 148, a point cloud is built for each of the selected image clusters and is then exported at 154. In one embodiment, automated metrics captured at 148 are fed back into the performance prediction at 146 as shown in FIG. 3. In one embodiment, quantitative metrics include one or more of point cloud density, point cloud predicted noise level and periodic checks of predicted geolocation accuracy using ground truth sites.

Figure 4:
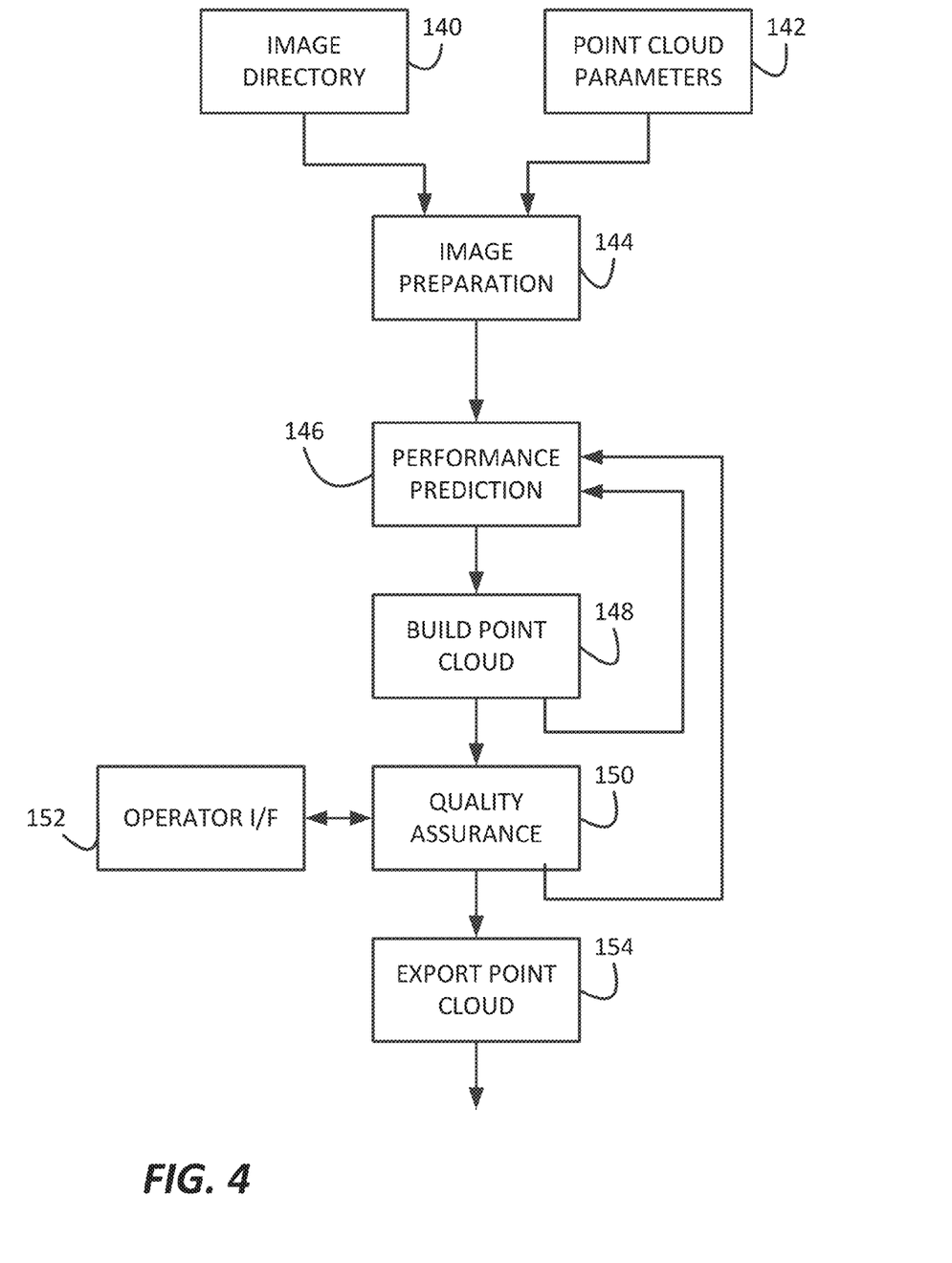

An alternate method of building a point cloud in system 100 is shown in FIG. 4. In the example shown in FIG. 4, images stored in an image directory are downloaded into a computer 102 or into an image processing server 112 at 140. In one such embodiment, to build a point cloud, all available imagery for a given geolocation is downloaded into a processor within system 100. In addition, at 142, point cloud parameters are loaded into system 100. In one such embodiment, point cloud parameters include the latitude, the longitude, and the radius of the desired point cloud.

At 144, images downloaded at 140 are chipped and only those images that fully cover the view under review are kept. The images that fully cover the view under review then become the set of imagery for performance prediction processing. In addition, at 144, metadata is extracted from each image.

At 146, the images are clustered and a performance prediction is made for each cluster. In some embodiments, a first pass is made based on a metadata-based performance prediction and a subset of image clusters is identified. That subset of image clusters then receives the more computationally intensive correlator-based performance evaluation. One or more image clusters is identified and passed to 148 to be used to build a point cloud.

At 148, a point cloud is built for each of the selected image clusters and stored for review by an operator at 150. In one such embodiment, an operator reviews the point cloud via a web browser 152 and, when approved, exports the point cloud at 154. In one embodiment, automated quantitative metrics captured at 148 and qualitative metrics captured at 150 are fed back into the performance prediction at 146. In one embodiment, a least square calculation is used to derive a new set of coefficients reflecting the qualitative measurements performed either automatically or by operators. The new set of coefficients is then used for future performance predictions. A similar process is used for the quantitative metrics.

In one embodiment, the qualitative measurements are used to calibrate not only the predicted performance calculations, but also the quantitative metrics so that the quantitative metrics more closely follow the qualitative metrics. In one such embodiment, by closely matching the quantitative metric calculation to the qualitative metric calculation, one can create an auto-tuned system capable of processing thousands of point clouds.

Figure 5:
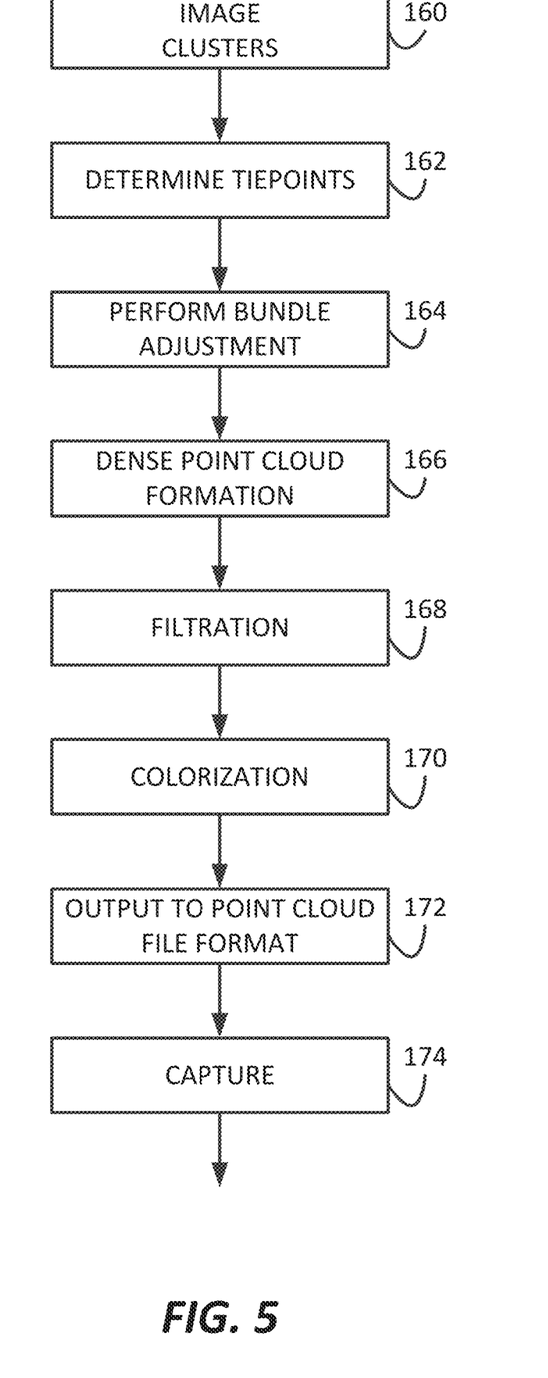
FIG. 5 illustrates a method of building a point cloud.

Building a point cloud will be discussed next. In one example embodiment, as is shown at 160 in FIG. 5, a point cloud is built from two or more chipped images. As can be seen in FIG. 5, at 162, tiepoints are determined in each of the images and, at 164, a photogrammetric bundle adjustment is performed as a function of the tiepoints. At 166, we perform dense point cloud formation. The point cloud is then filtered at 168, colorized at 170 and converted to a desired data format (e.g., BPF, LAS, NITF) at 172.

As noted above, a point cloud is a three-dimensional model of a location. In addition to location, (x,y,z, or latitude, longitude and elevation), in some embodiments, point cloud data sets also contain intensity values for each point. In some such embodiments, these intensity values are used to, for instance, colorize the point cloud as noted at 170 above. For example, a data set generated from a multi-spectral sensor may contain six bands of information (x, y, z, red, green, blue). This allows the points to be displayed in color.

At 174, the point cloud is captured (via, e.g., screenshots or movie capture) and metrics representative of the quantitative quality of the point cloud are captured. What results depends on the application but, in some embodiments, the results include one or more of colorized point clouds, screenshots of point clouds, movies and metrics files.

Figure 6:
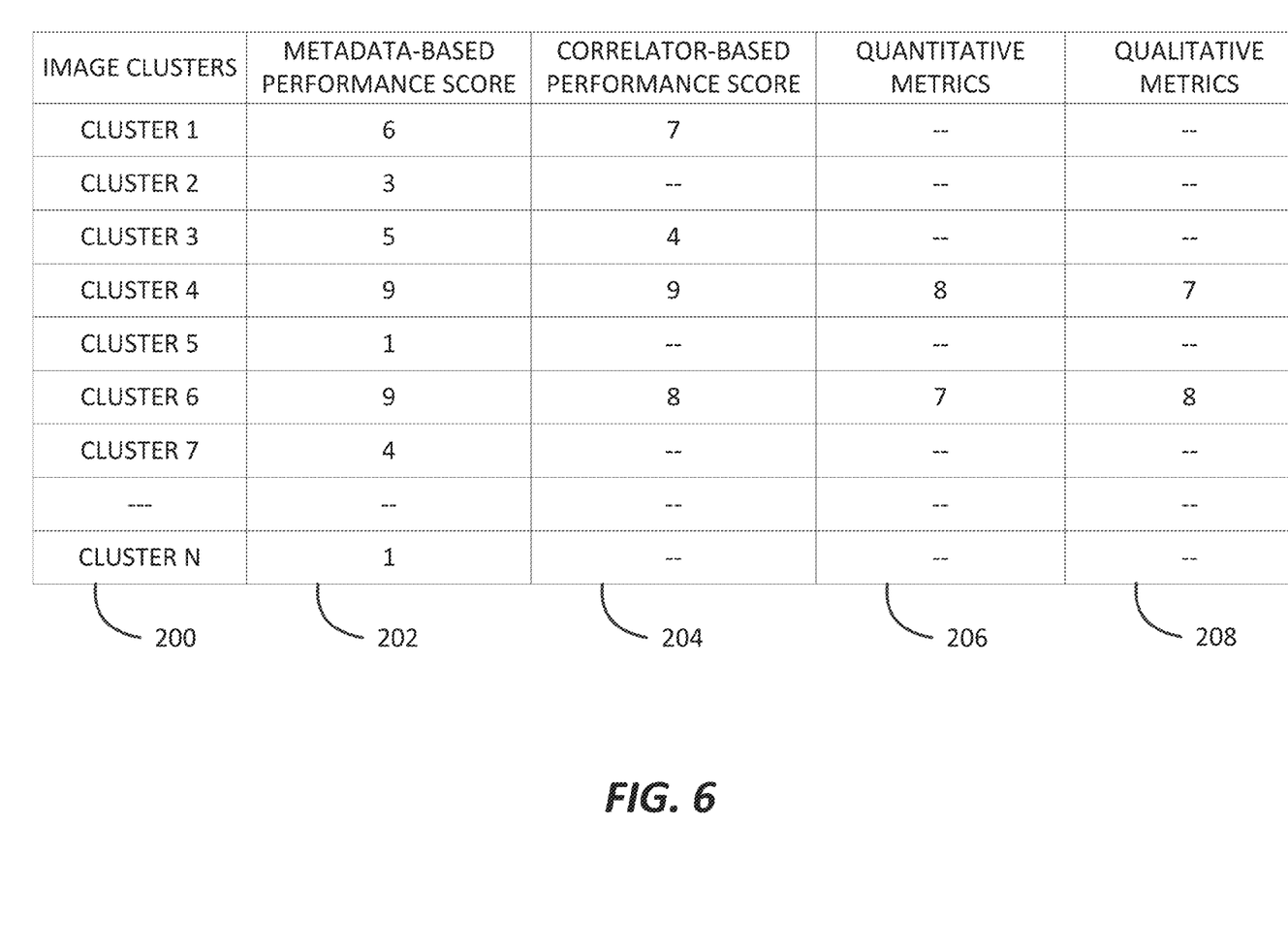
FIG. 6 provides an example of the selection and performance scoring of image clusters.

A method for selecting a subset of images to use in building a point cloud will be discussed next. In the example embodiment shown in FIG. 6, a point cloud will be formed from five images. As shown in FIG. 6, the first column (column 200) is a list of all possible combinations of five images selected from available and appropriate images. The second column (column 202) is a metadata-based performance score. In the example shown, since this score can be computed fairly quickly, we compute the metadata-based score for each image cluster. The score is scaled to between 1 and 10, with a 10 being the best score. As can be seen, the highest performing clusters are clusters 1, 3, 4 and 6.

Next, we compute the correlator-based performance score. As noted above, this calculation is computationally intensive so, in the example embodiment shown in FIG. 6, it is performed on only the four highest scorers shown in column 202. The results are shown in column 204. As can be seen in column 204, performance in the correlator-based performance score tracked that of the metadata-based score, but covers a larger range.

The two top scorers from column 204 are then used to build point clouds and quantitative measurements are used to compare the quality of the two point clouds. The result is shown in column 206. Qualitative review of the two point clouds is shown in column 208. It is interesting to note that the quality of the point cloud under quantitative metrics ends in a different result than the one performed by a human operator in column 208.

The examples shown above use metadata-based and correlator-based performance scores. In other embodiments, other combinations of metadata-based performance scores, correlator-based performance scores and geolocation positional accuracy can be used effectively to enhance identification of images and image clusters more likely to result in high quality point clouds.

In the example method shown in FIG. 6 above, subsets of five images are combined into clusters and evaluated based on one or more types of performance scores. Clusters formed from subsets of N images, where N is an integer greater than two, can also be evaluated using performance scores as described above.

Figure 7:
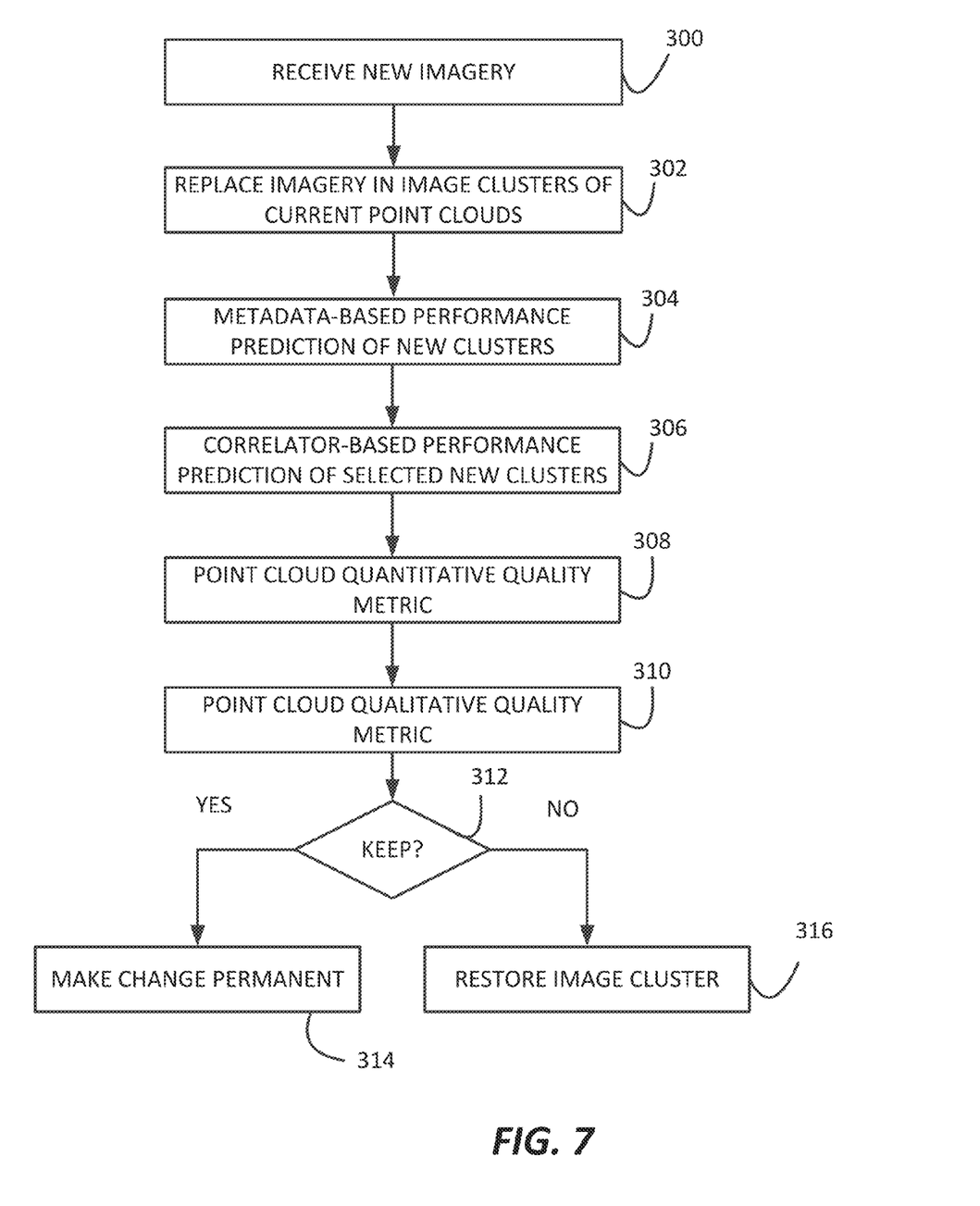
FIG. 7 illustrates a method of replacing imagery in an image cluster used to generate a point cloud.

A method of improving a point cloud is shown in FIG. 7. In the example embodiment shown in FIG. 7, new imagery is received at 300 and used, at 302, to replace imagery in one or more of the clusters (such as the clusters shown in column 200 of FIG. 6).

In the example shown in FIG. 7, a metadata-based performance prediction is performed on the modified cluster or clusters at 304 and a correlator-based performance prediction is determined at 306. At 308, point cloud quantitative metrics are derived from a point cloud generated from the modified clusters using computational methods or data sets. Since the metrics are calculated on the final product, the quality metrics are extremely accurate. Some quality metrics include point cloud density, point cloud predicted noise level and periodic checks of predicted geolocation accuracy using ground truth sites.

In some embodiments, control then moves to 310, where human operators use metrics such as perceived density/completeness and perceived noise are metrics to determine point cloud quality, and to 312, where the original point cloud qualitative score is compared to the qualitative score of the point cloud formed from the modified cluster or clusters. If the quality of the new point cloud is better than the original point cloud, the new point cloud is saved at 314 and the imagery is stored as part of the modified cluster. If, however, the quality of the new point cloud is less than the original point cloud, the old point cloud and its associated cluster are restored at 316. In some embodiments, a pruning step is applied at each step of the method of FIG. 7. For instance, a decision may be made at 304 to drop the lowest 50% of the modified cluster based on their metadata-based score, and to drop the lowest 50% of the remaining modified clusters at 306 based on their correlator-based score. The remaining clusters are then used to generate candidate point clouds based on the remaining clusters.

The systems and methods described above can be used as a preprocessing/post-processing element in a fully automated point cloud generation system and repository. Currently, passive 3D processing systems have a "try it and see" approach to processing. Time and resources are wasted on building point clouds out of imagery that is not sufficient to the task. This invention provides the passive 3D processing system an objective way to decide if and how to kick off point cloud generation based on a pool of available imagery, and it can also predict how proposed tasking will improve current point clouds.

An advantage of the approaches described above is that we can now automate the process of forming the image clusters used to generate a point cloud. Once you take the human operator out of the loop, you can now sort through large libraries of data sets, find clusters of images to work on and let the system push new, better point clouds out to analysts, instead of relying on what has been up to now an ad hoc user-initiated process.

For example, in some embodiments the same narrowband data used to evaluate a collected set of data is used to evaluate proposed collections of data. System tasking and collection planning is distinct from, but similar to, the use of the evaluation of existing data sets. While the application is different, the metadata used to plan a collection is the same as the metadata used to describe a completed collection. This allows the same tool to run on either real or proposed metadata. This is important as satellite (or aircraft) time needed to execute or capture the 2D collections is even more expensive than the computational time needed to process the collections. The point cloud quality scoring system is used, therefore, in such applications, to efficiently task high dollar assets.

Figure 8:
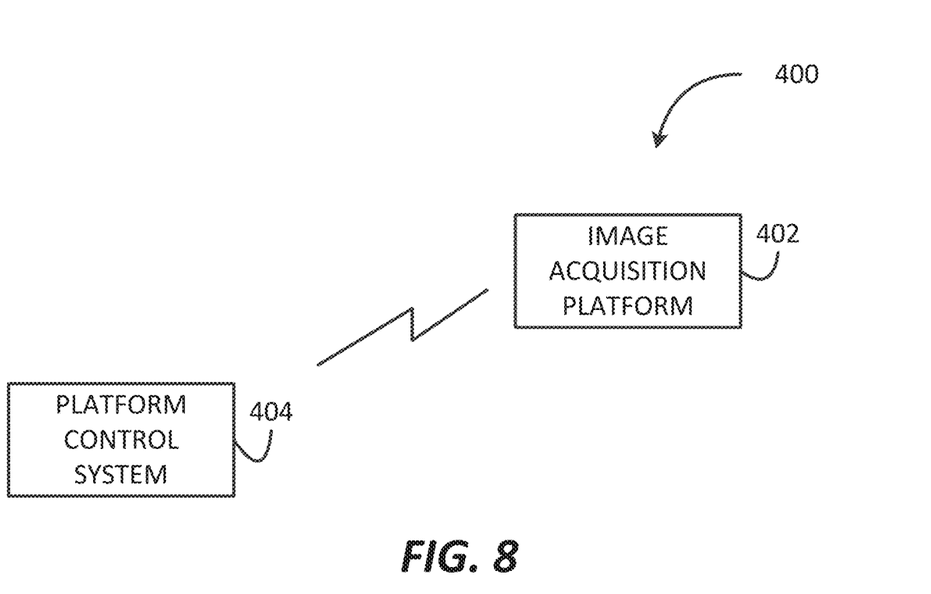
FIG. 8 illustrates an image acquisition system.

An example image acquisition system 400 is shown in FIG. 8. In the example embodiments shown in FIG. 8, image acquisition system 400 includes an image acquisition platform 402 and platform control system 404. In the embodiment shown, platform control system 404 receives information regarding the scene to be captured and determines the image acquisitions to be made as a function of that information.

In one example embodiment, the platform control system receives metadata information corresponding to images that could be captured by the image acquisition platform, performs metadata-based performance prediction of point cloud quality based on the received metadata information, and directs the image acquisition platform to capture images corresponding to the metadata that results in better metadata-based performance prediction.

In one example embodiment, the metadata associated with each image includes solar angle and image collection angles available to the image acquisition platform.

Figure 9:
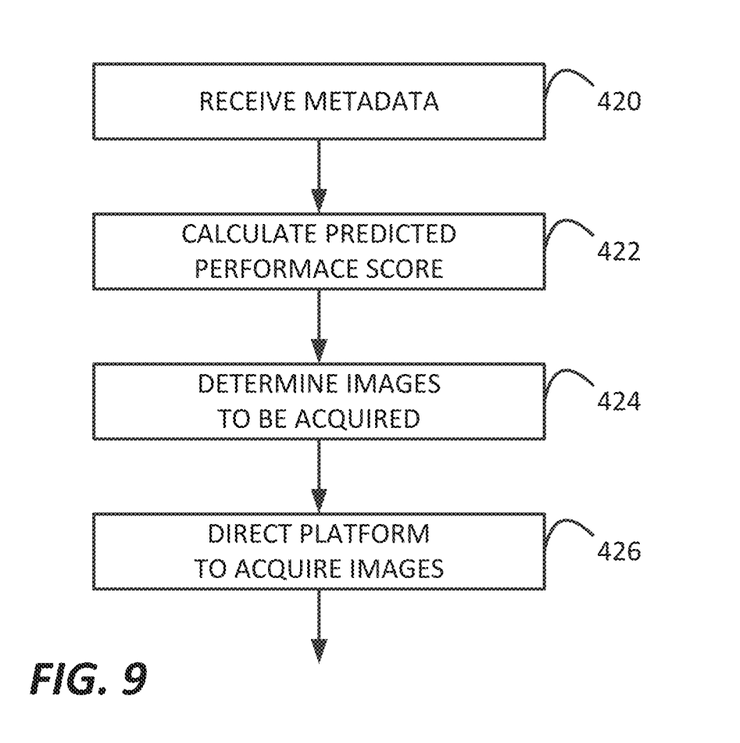
FIG. 9 illustrates a method for acquiring images.

A method of acquiring images from an image acquisition platform is shown in FIG. 9. In the method shown in FIG. 9, a controller receives, at 420, metadata corresponding to images that could be captured by the image acquisition platform, performs, at 422, a metadata-based performance prediction of point cloud quality based on the received metadata and determines, at 424, those images for acquisition that metadata-based performance predictions predict should result in higher quality point clouds.

In one example embodiment the method of FIG. 9 further includes directing, at 426, an image acquisition platform to capture the images determined, at 424, to be the highest priority targets.

In one embodiment, the metadata includes solar angle and the image collection angles available to the image acquisition platform.

In one embodiment, the metadata includes ground sample distances.

In one embodiment, the metadata includes any parameter that contributes to the quality of a point cloud.

In one example embodiment, system 400 acquires images for two or more point clouds. In one such embodiment, selecting includes selecting an image to capture that will have the biggest impact on point cloud quality across the two or more point clouds.

Another application, farther downstream, is the evaluation of an existing library of collections. In one embodiment, the disclosed tools are used to generate a location-specific score predicting the ability of an existing library to generate point clouds over any desired location. In one such embodiment, the point cloud quality scoring system of system 100 is run against imagery from a library under review in order to summarize the current state of 3D data for any location, without actually generating the 3D data. For example, system 100 may evaluate a library of 2D collections for a set of locations, and calculate a location specific score assigned based on the ability of the library to serve the 3D mission. Areas of low scores are flagged as areas in need of additional collections; areas with high scores are used to generate point clouds that are automatically pushed out to interested consumers. In some embodiment, these local scores are displayed as a heat map in a GIS display.

Figure 10:
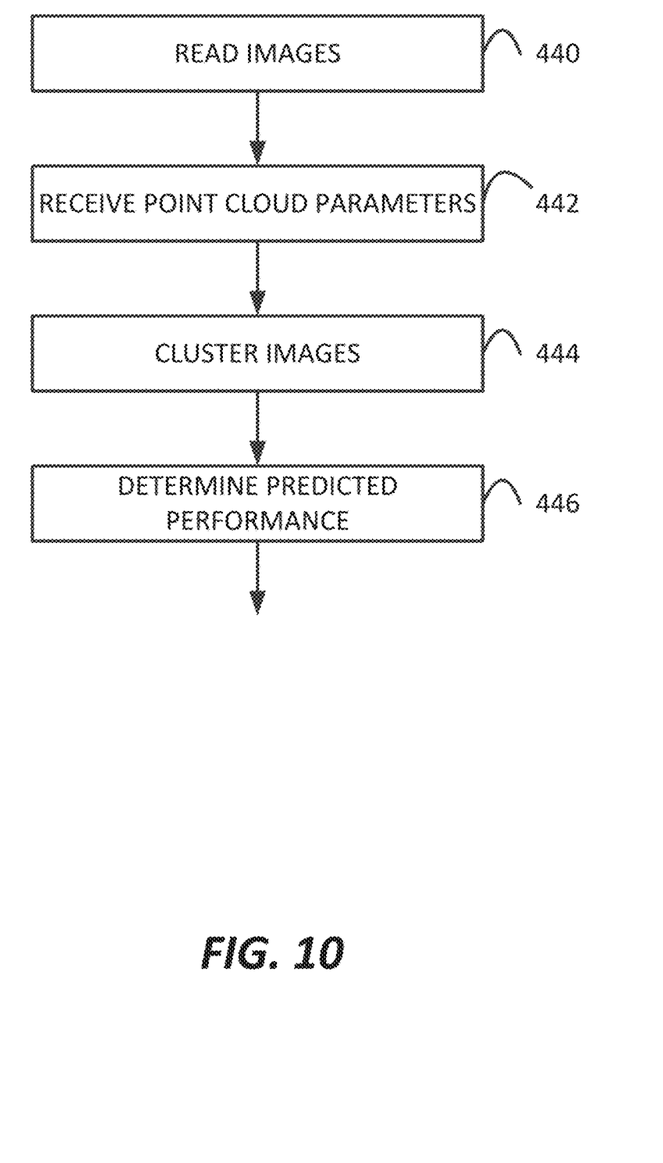
FIG. 10 illustrates a method of evaluating a library of images.

A method of evaluating a library of images is shown in FIG. 10. In the example embodiment shown in FIG. 10, at 440, images are read from the library of images and, at 442, point cloud parameters are received that correspond to a first and a second point cloud. At 444, the images are clustered in image clusters, wherein clustering includes determining the images corresponding to the first point cloud, determining the images corresponding to the second point cloud, clustering images corresponding to the first point cloud in first image clusters of two or more images, and clustering images corresponding to the second point cloud in second image clusters of two or more images. At 446, a predicted point cloud quality score is determined for each image cluster.

In one example embodiment, the predicted point cloud quality score is a metadata-based performance score.

In one example embodiment, the predicted point cloud quality score is a correlator-based performance score.

In one example embodiment, the predicted point cloud quality score is a score representing predicted geolocation accuracy.

In one example embodiment of the method for evaluating a library of images, determining point cloud quality at 446 includes generating a point cloud from each image cluster with a predicted point cloud quality score above a first threshold quality score, calculating a quality score for each generated point cloud and automatically pushing out the highest quality point clouds to analysts.

In one example embodiment, determining point cloud quality at 446 includes comparing each point cloud quality score to a threshold quality score and flagging a point cloud if none of the image clusters for that point cloud have point cloud quality above a threshold quality level.

The description and the drawings herein sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

What is claimed is:

1. A method of generating point clouds from passive images, comprising:
    receiving, by at least one processor, a first plurality of passive images, each of the passive images from the first plurality of passive images corresponding to a geographic location;
    selecting, by the at least one processor, a reference image from the first plurality of passive images;
    chipping, by the at least one processor, the first plurality of passive images using the reference image to obtain a second plurality of passive images, the second plurality of passive images being a subset of the first plurality of passive images;
    forming, by the at least one processor, a first plurality of image clusters, wherein each image cluster includes two or more passive images selected from the second plurality of passive images;
    performing, by the at least one processor, a metadata-based performance prediction on each image cluster of the first plurality of image clusters to obtain a corresponding metadata-based performance quality score for each image cluster, the metadata-based performance quality score indicating the predicted quality of a point cloud generated from the corresponding image cluster;
    selecting, by the at least one processor, a second plurality of image clusters from the first plurality of image clusters based on the metadata-based performance quality score;
    performing, by the at least one processor, a correlator-based performance prediction on each image cluster of the second plurality of image clusters to obtain a corresponding correlator-based performance quality score for each image cluster of the second plurality of image clusters, the correlator-based performance quality score indicating the predicted quality of a point cloud generated from the corresponding image cluster;
    selecting, by the at least one processor, a third plurality of image clusters from the second plurality of image clusters based on the correlator-based performance quality score;
    generating, by the at least one processor, a point cloud for each of the image clusters of the third plurality of image clusters to obtain a plurality of point clouds, each point cloud comprising a plurality of points, each point being defined by at least three coordinates of a three-dimensional coordinate system;
    selecting, by the at least one processor, one or more point clouds from the plurality of point clouds based on at least one quantitative quality metric; and
    outputting, by the at least one processor, the selected one or more point clouds to a designated location in a selected electronic format.

2. The method of claim 1, wherein the metadata-based performance prediction is based on at least a convergence angle between a plurality of line-of-sight vectors selected from pairs of images of each image cluster of the first plurality of image clusters.

3. The method of claim 1, wherein the correlator-based performance prediction is based on at least a solar elevation value determined from a plurality of images for a selected image cluster of the second plurality of image clusters.

4. The method of claim 1, further comprising using the at least one quantitative quality metric in a feedback loop for modifying the metadata-based performance prediction or the correlator-based performance prediction.

5. The method of claim 1, wherein the chipping of the first plurality of images is based on a plurality of point cloud parameters, the point cloud parameters defining at least one a latitude, longitude, or radius for the point cloud generated from the image clusters of the third plurality of image clusters.

6. The method of claim 1, further comprising colorizing a plurality of points of at least one point cloud selected from the plurality of point clouds according to an intensity value associated with each point of the plurality of points.

7. The method of claim 1, further comprising receiving a selection of one or more point clouds based on a qualitative quality metric determined for each point cloud of the plurality of point clouds; and wherein:
    the output of the selected one or more point clouds is based on the selection of the one or more point clouds based on the qualitative quality metric.

8. A system of generating point clouds from passive images, comprising:
    a non-transitory computer-readable storage medium storing instructions for execution by one or more processors; and
    one or more processors that, when the instructions are executed, are configured to:
        receive a first plurality of passive images, each of the passive images from the first plurality of passive images corresponding to a geographic location;
        select a reference image from the first plurality of passive images;
        chip the first plurality of passive images using the reference image to obtain a second plurality of passive images, the second plurality of passive images being a subset of the first plurality of passive images;
        form a first plurality of image clusters, wherein each image cluster includes two or more passive images selected from the second plurality of passive images;
        perform a metadata-based performance prediction on each image cluster of the first plurality of image clusters to obtain a corresponding metadata-based performance quality score for each image cluster, the metadata-based performance quality score indicating the predicted quality of a point cloud generated from the corresponding image cluster;
        select a second plurality of image clusters from the first plurality of image clusters based on the metadata-based performance quality score;

perform a correlator-based performance prediction on each image cluster of the second plurality of image clusters to obtain a corresponding correlator-based performance quality score for each image cluster of the second plurality of image clusters, the correlator-based performance quality score indicating the predicted quality of a point cloud generated from the corresponding image cluster;

select a third plurality of image clusters from the second plurality of image clusters based on the correlator-based performance quality score;

generate a point cloud for each of the image clusters of the third plurality of image clusters to obtain a plurality of point clouds, each point cloud comprising a plurality of points, each point being defined by at least three coordinates of a three-dimensional coordinate system;

select one or more point clouds from the plurality of point clouds based on at least one quantitative quality metric; and output the selected one or more point clouds to a designated location in a selected electronic format.

9. The system of claim 8, wherein the metadata-based performance prediction is based on at least a convergence angle between a plurality of line-of-sight vectors selected from pairs of images of each image cluster of the first plurality of image clusters.

10. The system of claim 8, wherein the correlator-based performance prediction is based on at least a solar elevation value determined from a plurality of images for a selected image cluster of the second plurality of image clusters.

11. The system of claim 8, wherein the one or more processors are further configured to use the at least one quantitative quality metric in a feedback loop for modifying the metadata-based performance prediction or the correlator-based performance prediction.

12. The system of claim 8, wherein the one or more processors are further configured to chip the first plurality of images based on a plurality of point cloud parameters, the point cloud parameters defining at least one a latitude, longitude, or radius for the point cloud generated from the image clusters of the third plurality of image clusters.

13. The system of claim 8, wherein the one or more processors are further configured to colorize a plurality of points of at least one point cloud selected from the plurality of point clouds according to an intensity value associated with each point of the plurality of points.

14. The system of claim 8, wherein the one or more processors are further configured to receive a selection of one or more point clouds based on a qualitative quality metric determined for each point cloud of the plurality of point clouds; and wherein:

the output of the selected one or more point clouds is based on the selection of the one or more point clouds based on the qualitative quality metric.

15. A non-transitory computer-readable storage medium storing instructions that, when executed by one or more processors, cause the one or more processors to perform a plurality of operations, the operations comprising:

receiving a first plurality of passive images, each of the passive images from the first plurality of passive images corresponding to a geographic location;

selecting a reference image from the first plurality of passive images;

chipping the first plurality of passive images using the reference image to obtain a second plurality of passive images, the second plurality of passive images being a subset of the first plurality of passive images;

forming a first plurality of image clusters, wherein each image cluster includes two or more passive images selected from the second plurality of passive images;

performing a metadata-based performance prediction on each image cluster of the first plurality of image clusters to obtain a corresponding metadata-based performance quality score for each image cluster, the metadata-based performance quality score indicating the predicted quality of a point cloud generated from the corresponding image cluster;

selecting a second plurality of image clusters from the first plurality of image clusters based on the metadata-based performance quality score;

performing a correlator-based performance prediction on each image cluster of the second plurality of image clusters to obtain a corresponding correlator-based performance quality score for each image cluster of the second plurality of image clusters, the correlator-based performance quality score indicating the predicted quality of a point cloud generated from the corresponding image cluster;

selecting a third plurality of image clusters from the second plurality of image clusters based on the correlator-based performance quality score;

generating a point cloud for each of the image clusters of the third plurality of image clusters to obtain a plurality of point clouds, each point cloud comprising a plurality of points, each point being defined by at least three coordinates of a three-dimensional coordinate system;

selecting one or more point clouds from the plurality of point clouds based on at least one quantitative quality metric; and outputting the selected one or more point clouds to a designated location in a selected electronic format.

16. The non-transitory computer-readable storage medium of claim 15, wherein the metadata-based performance prediction is based on at least a convergence angle between a plurality of line-of-sight vectors selected from pairs of images of each image cluster of the first plurality of image clusters.

17. The non-transitory computer-readable storage medium of claim 15, wherein the correlator-based performance prediction is based on at least a solar elevation value determined from a plurality of images for a selected image cluster of the second plurality of image clusters.

18. The non-transitory computer-readable storage medium of claim 15, wherein the plurality of operations further comprise using the at least one quantitative quality metric in a feedback loop for modifying the metadata-based performance prediction or the correlator-based performance prediction.

19. The non-transitory computer-readable storage medium of claim 15, wherein the chipping of the first plurality of images is based on a plurality of point cloud parameters, the point cloud parameters defining at least one a latitude, longitude, or radius for the point cloud generated from the image clusters of the third plurality of image clusters.

20. The non-transitory computer-readable storage medium of claim 15, wherein the plurality of operations further comprise colorizing a plurality of points of at least one point cloud selected from the plurality of point clouds according to an intensity value associated with each point of the plurality of points.

21. The non-transitory computer-readable storage medium of claim 15, wherein the plurality of operations further comprise receiving a selection of one or more point clouds based on a qualitative quality metric determined for each point cloud of the plurality of point clouds; and wherein:
 the output of the selected one or more point clouds is based on the selection of the one or more point clouds based on the qualitative quality metric.

* * * * *